(12) United States Patent
Steindl

(10) Patent No.: US 7,373,578 B2
(45) Date of Patent: May 13, 2008

(54) CYCLIC COMMUNICATION METHOD VIA A BUS

(75) Inventor: Günter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 960 days.

(21) Appl. No.: 10/344,040

(22) PCT Filed: Jul. 30, 2001

(86) PCT No.: PCT/EP01/08820

§ 371 (c)(1),
(2), (4) Date: Feb. 7, 2003

(87) PCT Pub. No.: WO02/13450

PCT Pub. Date: Feb. 14, 2002

(65) Prior Publication Data

US 2004/0027235 A1    Feb. 12, 2004

(30) Foreign Application Priority Data

Aug. 10, 2000   (EP)   ................................. 00117177

(51) Int. Cl.
*H04L 1/18* (2006.01)
(52) U.S. Cl. ..................................... 714/748
(58) Field of Classification Search ..................... None
See application file for complete search history.

(56) References Cited

U.S. PATENT DOCUMENTS

| | | | |
|---|---|---|---|
| 4,726,027 A * | 2/1988 | Nakamura et al. | 714/748 |
| 4,896,151 A | 1/1990 | Kuranami et al. | |
| 4,897,831 A * | 1/1990 | Negi et al. | 370/249 |
| 5,528,605 A * | 6/1996 | Ywoskus et al. | 714/749 |
| 5,754,535 A * | 5/1998 | Vandenabeele et al. | 370/321 |
| 5,815,660 A * | 9/1998 | Momona | 709/208 |
| 6,909,718 B1 * | 6/2005 | Aramaki et al. | 370/394 |
| 7,032,153 B1 * | 4/2006 | Zhang et al. | 714/749 |

FOREIGN PATENT DOCUMENTS

| | | |
|---|---|---|
| DE | 195 09 558 A1 | 9/1996 |
| DE | 196 20 137 A1 | 11/1997 |

OTHER PUBLICATIONS

Cena et al., "Standard Field Bus Networks for Industrial Applications", Computer Standards & Interfaces 17 (1995), pp. 155-167.

* cited by examiner

*Primary Examiner*—Guy Lamarre
*Assistant Examiner*—Sam Rizk
(74) *Attorney, Agent, or Firm*—Staas & Halsey LLP

(57) ABSTRACT

A method for cyclical communication between communications stations controls or surveys a technical process, through a bus. Communications relations, which are provided for the communication stations are executed during each bus cycle of predetermined duration and if a communications relation is disturbed, its repetition is scheduled for a succeeding bus cycle and the disturbed communications relation is acknowledged with a special acknowledgement code.

20 Claims, 7 Drawing Sheets

CYCLIC COMMUNICATION METHOD VIA A BUS

CROSS REFERENCE TO RELATED APPLICATIONS

This application is based on and hereby claims priority to PCT Application No. PCT/EP01/08820 filed on 30 Jul. 2001 and European Application No. 001 17 177.6 filed on 10 Aug. 2000, the contents of which are hereby incorporated by reference.

BACKGROUND OF THE INVENTION

The invention relates to a method for cyclic communication between communication stations provided for controlling or monitoring a technical process, via a bus, in which communication sessions planned for the communication stations are executed during in each case one bus cycle.

Such a communication method is known from the standard EN 50 170 or PROFIBUS standard. The PROFIBUS is a so-called field bus which is used for communicatively linking communication stations provided for automating a technical process. A communication station at this or a similar bus is, e.g., a so-called stored-program control (SPC). A further communication station at the bus is, e.g., a so-called decentralized peripheral device to which external sensors or actuators can be connected for controlling or monitoring the technical process.

Controlling a technical process frequently also includes closed-loop control tasks. In this context, closed-loop control comprises picking up a measurement value from the technical process and outputting control information to the technical process. Both the picking-up of the measurement value and the outputting of the control information is usually cyclic. Since the measurement value is thus available not continuously but only in each case at the time when it is picked up, i.e. at the sampling time, this is a sampled-data control system, the quality or stability of which is primarily dependent on the equidistance of the sampling times.

Frequently, the measurement value is picked up from the process by a first communication station and processed by a second communication station. Using the measurement value, this second communication station also generates the control information to be output. The control information is then output to the process by a third communication station. The distance between two sampling times, and, therefore, the sampling frequency is thus determined by the duration of the communication between the respective communication stations.

To ensure equidistance of the sampling times, a constant bus cycle time is provided, e.g. in the PROFIBUS. The bus cycle time is the time interval within which all cyclic communication sessions planned for the communication stations connected to the bus are executed exactly once. A communication method with constant bus cycle time is known, e.g., from German patent application 199 39 182 (date of application 20, Aug. 1999).

A communication comprises the transfer of a message via the bus from the transmitting communication station to the receiving communication station. The time required for transferring a message is essentially determined by the volume of data transferred. The volume of data of cyclic communications, however, is essentially constant. Thus, an approximate equidistance between the individual communications is obtained with a constant bus cycle time. The approximate equidistance of the individual communications is accompanied by an approximate equidistance of the sampling times because the measurement value picked up from the process is a data item of a communication or, respectively, a message.

To ensure actual equidistance, the bus cycle time is longer than the time which would be required for executing all planned communications. The additional time is available as reserve for message retransmissions and so-called acyclic messages. If no message retransmissions are required in a bus cycle or there are no acyclic messages ready for transfer, the system still waits until the predetermined bus cycle time (including the spare time) has elapsed before it begins the next bus cycle. This results in a fixed timing pattern for the planned communications, by which the equidistance of the samples can be ensured.

The disadvantageous factor in this known communication method is, however, that this equidistance is no longer guaranteed in the case of a disturbed communication session. According to EN 50 170, in the case of a disturbed communication session, this session is repeated between once (1 time) and fifteen times (15 times) in the same bus cycle. This leads to the duration of the bus cycle being extended by the duration resulting from the repetition of the disturbed communication session. Equidistance of individual communication sessions over a number of bus cycles—as is required, in particular, for critical sampled-data control systems—cannot be guaranteed with the known communication method in the case of communication and/or transmission disturbances.

The reason for this is that each communication session which is executed after the disturbed communication session in time in the bus cycle is offset in time in comparison with a "normal" bus cycle, i.e. a bus cycle without disturbed communication session. This also lowers the quality of a sampled-data control system. In the extreme case, even the stability of the sampled-data control system can be put in question.

SUMMARY OF THE INVENTION

One aspect of the invention is based on the object, therefore, of specifying a communication method by which equidistant sampling of a measurement value of the technical process is also still possible in the case of transmission disturbances.

For this purpose, it is provided in a method for cyclic communication between communication stations provided for controlling or monitoring a technical process, via a bus, in which communication sessions planned for the communication stations are executed during in each case one bus cycle of predeterminable duration, that, in the case of a disturbed communication session, its retransmission is planned for a subsequent bus cycle and that the disturbed communication session is acknowledged with a special acknowledgement code. According to an alternative, no retransmission of the disturbed communication session takes place after a disturbed communication session which is acknowledged with a special acknowledgement code. This can be tolerated since, in the case of a cyclic communication, a retransmission is replaced by the communication session of the next cycle. In this arrangement, it is possible to adjust whether no retransmission at all, one, two etc. retransmissions of the disturbed communication session are to take place.

The advantages achieved by the method relate, in particular, to the duration of the bus cycle with the disturbed communication session remains unaffected by retransmission and/or correction measures. This is achieved by displacing a retransmission of a disturbed communication session into a subsequent bus cycle. In the case of an immediate retransmission of a disturbed communication session in the same bus cycle, the starting time of all communication sessions following the disturbed communication session in the bus cycle is displaced with reference to the bus cycle. Equidistance of these displaced communication sessions over a number of bus cycles would no longer be guaranteed.

If values which are included in a sampled-data control system are transmitted by the displaced communication sessions, the sampling frequency of the sampled-data control systems concerned is no longer constant which is accompanied by a deterioration in the quality of the sampled-data control system and possibly even instability of the sampled-data control system. By displacing the retransmission of a disturbed communication session into a subsequent bus cycle, the starting times of the subsequent communications essentially remain unaffected. Thus, the equidistance of the individual communication sessions is also guaranteed over a number of bus cycles so that the communication method is also suitable for critical sampled-data control systems.

So that no retransmission and/or correction measures take place in the bus cycle with the disturbed communication sessions, the disturbed communication session is acknowledged with a special acknowledgement code. This leads to the omission of, in particular, transmission and/or correction measures so that the remaining communication sessions planned for the bus cycle can be executed.

If further disturbed communication sessions occur in the same bus cycle, the remaining disturbed communication sessions are also dealt with like the first disturbed communication session. i.e. its retransmission, too, is displaced into a subsequent bus cycle.

So that the retransmission of a disturbed communication session in a subsequent bus cycle does not impair the equidistance of the communication sessions planned for this subsequent bus cycle, the retransmission of the disturbed communication session takes place following the communication sessions planned for this bus cycle. Due to the fact that the retransmission of the disturbed communication session takes place following the communication sessions planned for this bus cycle, their starting times, based on the bus cycle, remain unaffected. The equidistance of the communication sessions over a number of bus cycles is thus guaranteed even during the retransmission of the disturbed communication session.

The retransmission of the disturbed communication session is advantageously planned for a bus cycle immediately following the bus cycle with the disturbed communication session. As a result, the time difference between the disturbed communication session, the time of the planned execution and the retransmission, the time of the actual execution, remains as small as possible.

If the disturbed communication session is acknowledged with the special acknowledgement code like a faultless communication session, a delay in the execution of the communication sessions following in the bus cycle is avoided. It is only in the case of a communication session which has been executed faultlessly or acknowledged as faultless that the execution of the communication sessions following in the bus cycle can be continued. Due to the acknowledgement of the disturbed communication session with the special acknowledgement code, this session cannot be distinguished from a faultless communication session.

First, the beginning of the execution of the communication sessions following in the bus cycle is not delayed by any evaluation of a special acknowledgement code.

The special acknowledgement code is advantageously converted into a normal acknowledgement code. This reduces the number of possible acknowledgement codes to be checked so that, in spite of the existence of an acknowledgement code which is additional in fact, the complexity of the analysis of the possible acknowledgement codes is not increased. The normal acknowledgement code is the acknowledgement code which identifies a communication session which has been faultlessly executed. The special acknowledgement code can be converted into a normal acknowledgement code, e.g. by so-called "masking". If, e.g., the special acknowledgement code only differs from the normal acknowledgement code due to the first bit being set, the masking can begin by a logical AND operation on the special acknowledgement code, e.g. with the hexadecimal value "7FFF".

If a retransmission counter is provided by which the number of retransmissions of the disturbed communication session is counted, it can be determined at any time how long the disturbance of the communication session already exists.

If a limit value is provided for the retransmission counter and any retransmission of the disturbed communication session is acknowledged with a fault acknowledgement code after the limit value has been reached, a disturbance of a communication session which lasts "too long" can be detected.

The limit value from which each retransmission of the disturbed communication session is acknowledged with a fault acknowledgement code can be suitably predetermined. Thus, the time interval after the passage of which a disturbance of a communication session exists for "too long" can be predetermined. The limit value can be preferably predetermined individually for each communication session. Thus, the limit value for a communication session which, e.g., supplies data for a critical first sampled-data control system can be set to a different limit value than that of a communication session by which only record data are transmitted.

If the retransmission counter can be read out by the communication station involved in the disturbed communication session, it can determine at any time whether and possibly for how long a communication session is disturbed.

If at least one threshold value is provided for the retransmission counter and planned measures are initiated by the communication station reading out the retransmission counter when the threshold value is reached, it is also possible to respond to the disturbance of the communication session in a suitable manner even before the limit value is reached. For example, when a first threshold value is reached, a corresponding note can be output, for instance on a screen or printer, when a second threshold value is reached a visual or oral warning can be initiated and when a third threshold value is reached, fault-limiting measures can be initiated. The fault-limiting measures can relate to, e.g., attempting to establish the communication session on a different path—for example with a redundant bus—, or placing the technical process—possibly the part process controlled by the communication station—into a safe state.

Advantageously, a structure is provided in a memory of at least one communication station which has for each communication session one field in which the value of the retransmission counter is stored in a first position, the limit value is stored in a second position and the at least one threshold value, together with a reference to the measure to be initiated when the threshold value is reached, is stored in a third position. The structure is used for the compact storage of the essential data which are provided for executing the communication method. Storing a reference to the measure to be initiated when the threshold value is reached makes it possible to directly call up a program routine in which the measure is programmed.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
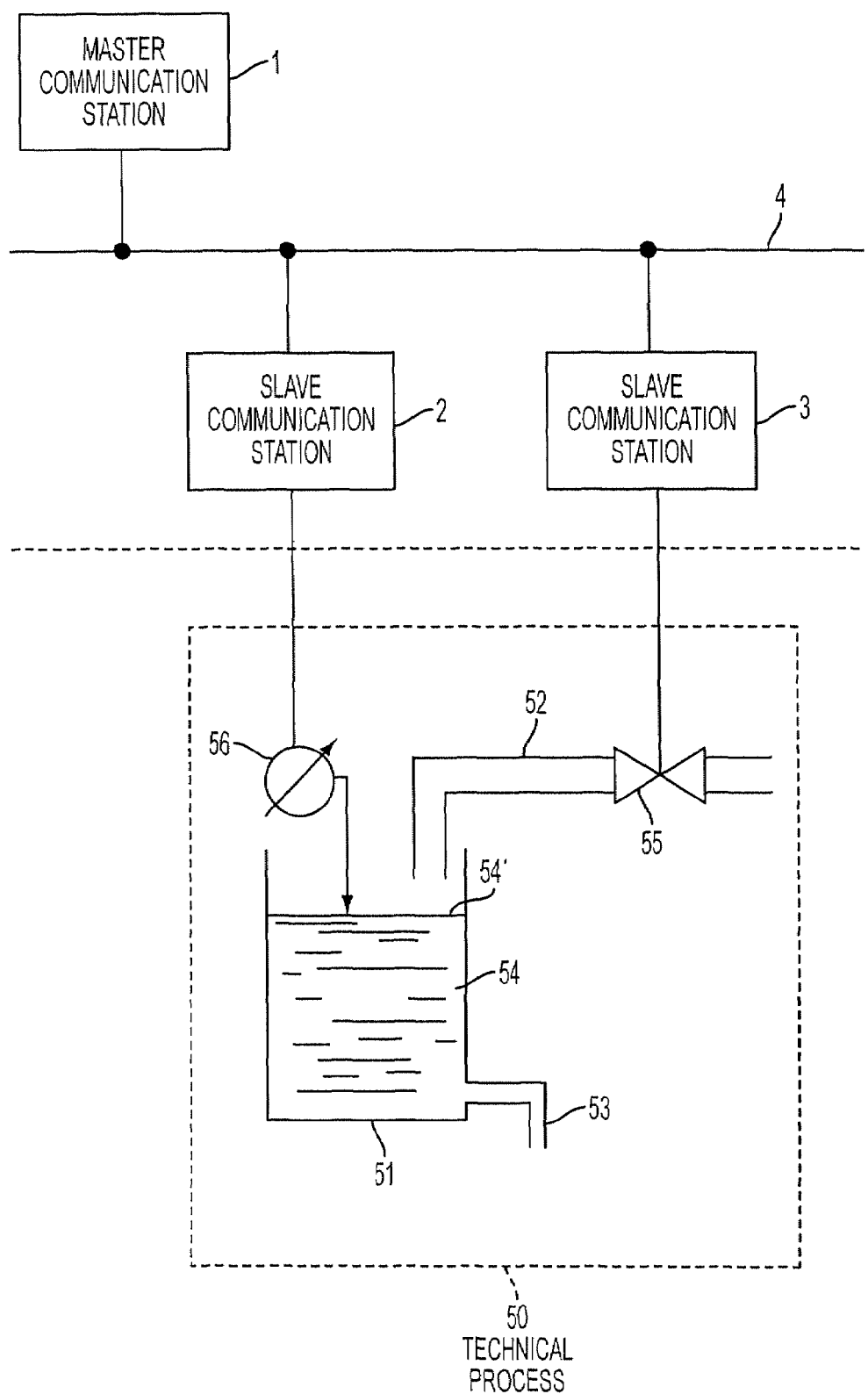
FIG. 1 shows communication stations communicatively connected via a bus for controlling a technical process.

Reference will now be made in detail to the preferred embodiments of the present invention, examples of which are illustrated in the accompanying drawings, wherein like reference numerals refer to like elements throughout.

FIG. 1 shows communication stations 1, 2, 3, the communication station designated by the reference symbol 1 being a so-called master 1—e.g. a stored-program control—and the communication stations designated by the reference symbols 2, 3 being so-called slaves 2, 3—e.g. decentralized peripheral devices. The communication stations 1, 2, 3 are communicatively connected to one another via a bus 4.

The master 1 is a communication station which has an active transmit authorization on the bus 4. A slave 2, 3, in contrast, only transmits after having first been addressed by the master 1. Slaves 2, 3 are, therefore, lacking the active transmit authorization because they only respond to a request (being addressed) by the master 1.

The communication stations 1, 2, 3 are provided for controlling or monitoring a technical process 50 shown diagrammatically. The technical process 50 comprises a reactor 51 with an inlet 52 and an outlet 53. The reactor 51 is fed by the inlet 52. A reagent 54 leaves the reactor 51 via the outlet 53. The inlet 52 is controlled by a valve 55. A filling level meter 56 is used for determining a filling level 54' of the reactor 51.

A simple control and/or monitoring (automation) of the technical process 50, which will be used by way of an example in the text which follows, relate to an assumption that the valve 55 is controlled with a view to a constant filling level 54' of the reactor 51.

Figure 2A:
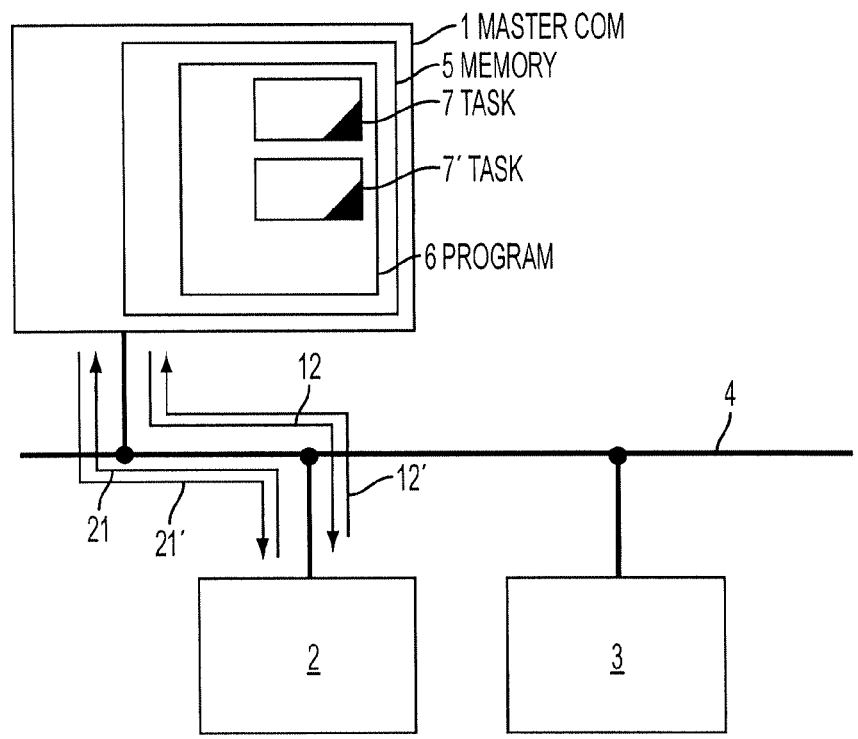
FIGS. 2a and 2b show communication sessions between individual communication stations.
Figure 2B:
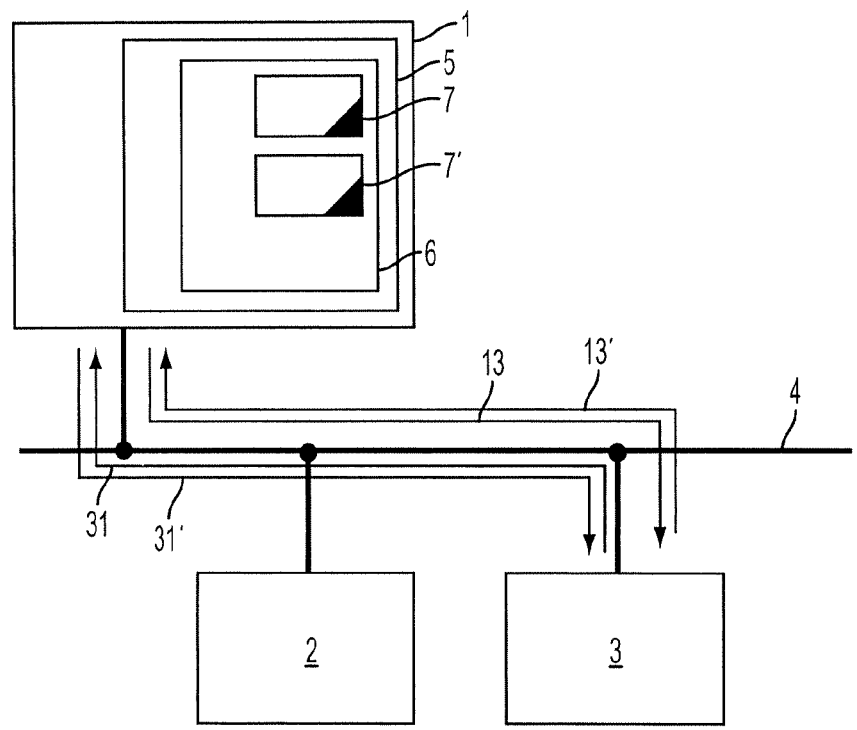

FIGS. 2a and 2b show the data exchange or, respectively, communication sessions 12, 21, 13, 31 between communication stations 1, 2, 3 for this automation. The data exchange takes place under control of a program 6, stored in a memory 5, which is executed by the master 1. For this purpose, the program 6 comprises a task 7, 7' which is executed in a fixed timing pattern and is called up, e.g., every 500 ms. With each execution of the task 7, 7', a data exchange 12, 21 and 13, 31, respectively, takes place between the master 1 and the slave 2 (FIG. 2a) and between master 1 and slave 3 (FIG. 2b).

In accordance with a planned communication session, a data exchange takes place between the relevant communication stations 1, 2, 3. The data exchange takes place by a message 12, 21, 13, 31. In the text which follows, therefore, the terms communication/communication session and message are used synonymously. If the master 1 addresses a slave 2, 3, this takes place by a message 12, 13. The slave 2, 3, in turn, responds to this stimulus with a message 21, 31.

FIG. 2a shows a message 12 sent by the master 1 to the slave 2. The message 12 comprises e.g. output and control data in the form of digital and/or analog values, e.g. a maximum value for the filling level 54'. However, the message 12 also causes the slave 2 to send its input data to the master 1 in a message 21. The message 21 thus contains, in particular, a value representing the filling level 54' of the reactor 51 which is picked up by the filling level meter 56. The message 12 implicitly issues to the slave 2, which is not actively authorized to transmit, an authorization for transferring the data requested by the master 1. This is done by the message 21.

FIG. 2b shows a message 13 by which the master 1 sends to the slave 3 the respective output data. The message 13 comprises output and/or control data in the form of digital or analog values, among them also a value predetermining the position of the valve 55. The message 13 causes the slave 3 to send its input data, e.g. also a value representing the actual volume flowing through the inlet 12, to the master 1 in a message 31.

A message 12, 13, 21, 31 is always acknowledged 12', 13', 21', 31'. The faultless undisturbed transmission of a message 12, 13, 21, 31 is acknowledged by a normal acknowledgement which specifies that the communication 12, 13, 21, 31 has been executed faultlessly. The normal acknowledgement comprises, e.g., a normal acknowledgement code (not shown) with the value "0x00".

Automation of the technical process 50 (FIG. 1) requires a closed-loop control for keeping the filling level 54' of the reactor 51 constant. Since the message 21 comprises the measurement value of the filling level 54' and the latter is thus "sampled" only when the slave 2 transmits the corresponding message 21 to the master 1, this is a sampled-data control system. The quality/stability of such a sampled-data control system is mainly determined by the time interval between two samples of a process parameter (in this case filling level 54'). To achieve stable closed-loop control, the basic mathematical control models require sampling at equidistant times.

Figure 3:
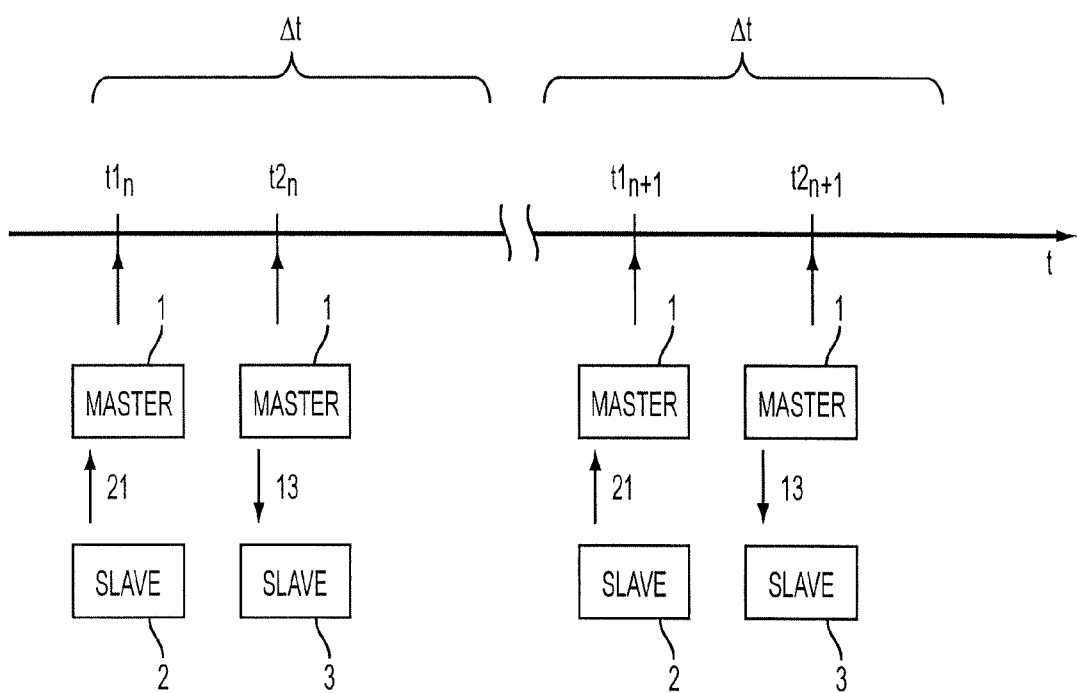
FIG. 3 shows faultlessly executed communication sessions during two bus cycles.

FIG. 3 diagrammatically shows the times $t1_n$, $t2_f$, $t1_{n+1}$, $t2_{n+1}$ cluttered along a time axis, at which the messages 21, 13 are transmitted to and from the corresponding slave 2, 3.

The slave 2 transmits the current filling level 54' of the reactor 51 to the master 1 with the message 21. At times $t1_n$, $t1_{n+1}$, the process parameter "filling level" 54' is thus sampled. The new position of valve 55 is predetermined by master 1 for slave 3 with message 13. Messages 12 (FIG. 2a) and 31 (FIG. 2b) are not shown for reasons of clarity.

To obtain stable control of the filling level 54', it is important that the time interval between two successive times $t1_n$, $t1_{n+1}$, at which the filling level 54' is sampled, remains constant. The time difference between time $t1_n$ and $t2_{n+1}$, i.e. the picking up of the filling level 14' and the outputting of the resultant control value to the process 50, represents a dead time which can be easily taken into consideration and compensated for mathematically.

In the case of an undisturbed faultless communication, the equidistance between two successive times $t1_n$, $t1_{n+1}$ is guaranteed by the fixed timing pattern in which the task 7, 7' (FIG. 2a, 2b) is executed under the control of which the communication sessions are executed.

The time interval Δt designates the duration of a bus cycle, the terms bus cycle and duration of a bus cycle being used synonymously in the text which follows. The duration of a bus cycle (bus cycle time) Δt is constant. During a bus cycle Δt, all planned communication sessions are executed. If the starting time of task 7, 7' (FIG. 2a, 2b), under the control of which the data exchange 21, 13 between the master 1 and the slaves 2, 3 is executed, falls into a bus cycle Δt, the communication sessions 21, 13 belong to the communication sessions planned for this bus cycle Δt.

FIG. 3 shows two bus cycles Δt which in each case comprise the communication sessions 21, 13. These two bus cycles Δt do not follow one another directly in time—indicated by the broken timeline. Between the two bus cycles shown, one or more other bus cycles are executed which do not include the communication sessions 21, 13.

Figure 4:
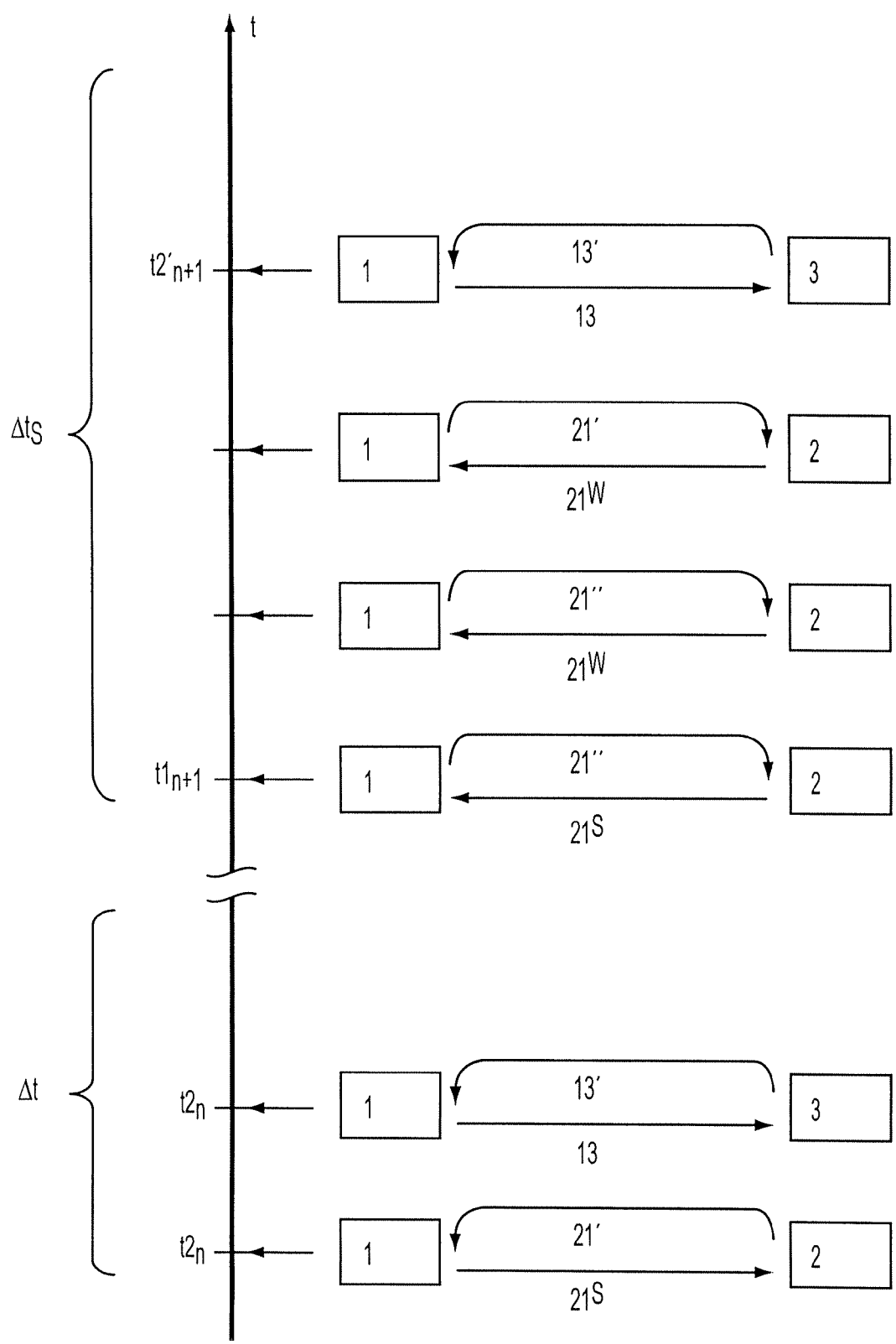
FIG. 4 shows a message retransmission as a consequence of a disturbed communication session.

FIG. 4 shows the effect of a disturbed communication session $21^s$ on the duration of a bus cycle Δt. In the second bus cycle $Δt_s$ shown, a disturbance which impairs the execution of the communication session 21 occurs at time $t1_{n+1}$. The disturbed communication session $21^s$ is acknowledged with a fault acknowledgement 21". Each acknowledgement 21', 21" comprises an acknowledgement code 21', 21" so that this fault acknowledgement 21", too, comprises a fault acknowledgement code 21" which unambiguously species the type of the fault. The disturbed communication relation $21^s$ is followed by a retransmission $21^w$ of the disturbed communication session. The first retransmission $21^w$ of the disturbed communication session cannot be executed faultlessly, either, and is, therefore, acknowledged with a fault acknowledgement 21". It is only after the second retransmission $21^w$ that it can be faultlessly executed. The faultlessly executed second retransmission $21^w$ is correspondingly acknowledged with a normal acknowledgement 21'. The normal acknowledgement 21' comprises a normal acknowledgement code 21' which specifies the faultless execution.

Overall, the communication session 13 is thus executed correspondingly later in time, namely only at time $t2'_{n+1}$. In the case of a bus cycle Δt (FIG. 3) which is not encumbered by a disturbed communication session, in contrast, the execution occurs at time $t2_{n+1}$. The time offset by which the communication session 13 is executed later corresponds to the duration of the two retransmissions $21^w$ of the disturbed communication session $21^s$.

The new value for the position of the valve 55 (FIG. 1) is transmitted with the message 13. The intervention in the closed-loop control is thus delayed, i.e. no longer at equidistant times so that it may no longer be possible to keep the filling level 54' (FIG. 1) constant. The more dynamic the controlled system the stronger this will affect the quality of the closed-loop control. In the extreme case, even the stability of the closed-loop control can be put in question. Furthermore, the duration Δts of the bus cycle with the disturbed communication 21s is extended in comparison with the duration Δt of the bus cycle with the faultlessly executed communication 21. This leads to communication sessions executed in each bus cycle also no longer being equidistant.

Figure 5:
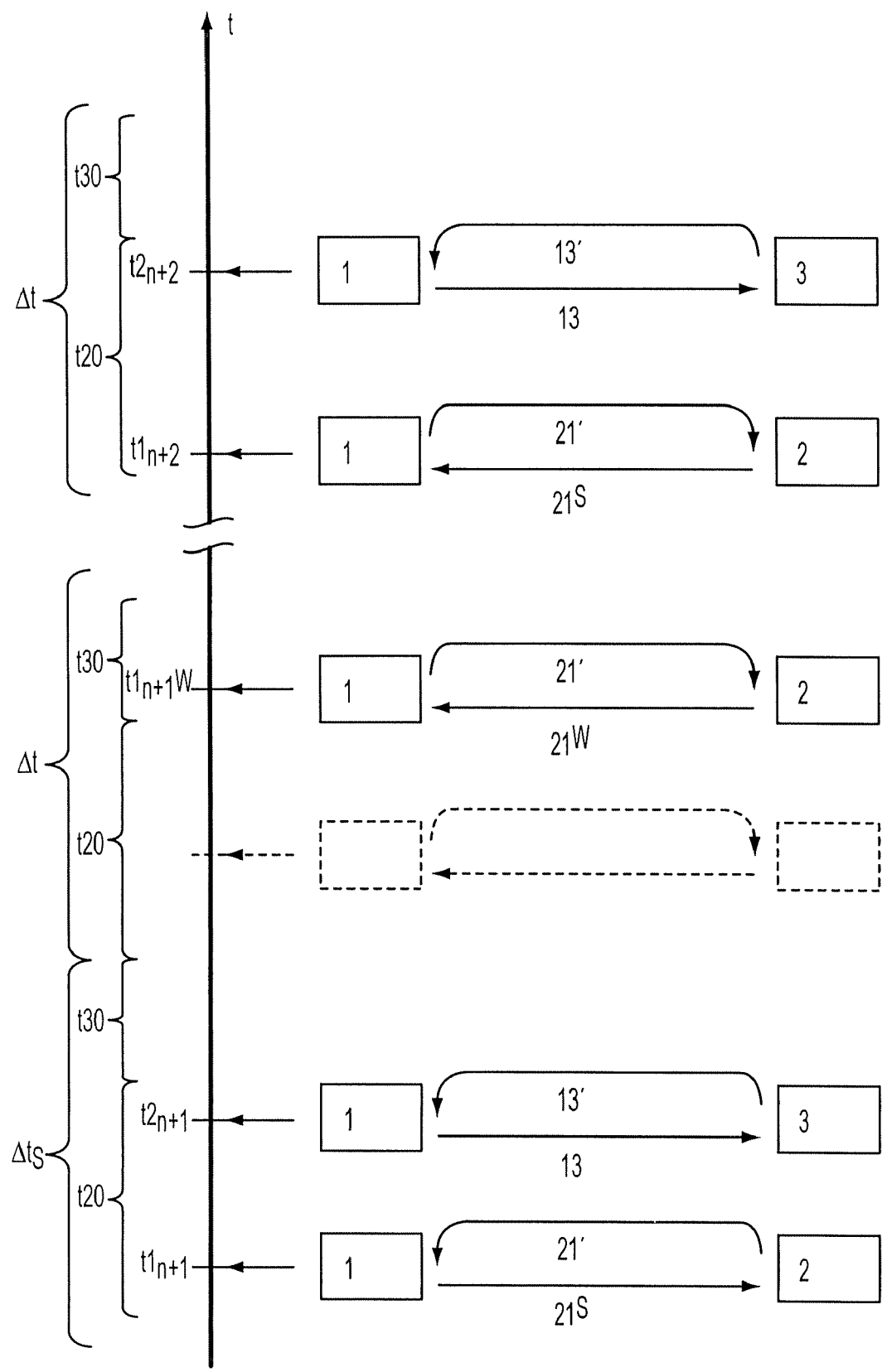
FIG. 5 shows a message retransmission in a later bus cycle.

FIG. 5 shows how equidistance is guaranteed even in the case of a disturbed communication session $21^s$. It shows two bus cycles $Δt_s$, Δt immediately following one another. In the first bus cycle $Δt_s$, a disturbance $21^s$ occurs. A third bus cycle Δt is executed later in time—indicated by the broken timeline.

Analogously, a disturbance $21^s$ occurs during the execution of the communication session 21—at time $t1_{n+1}$. The disturbed communication session $21^s$ is acknowledged with a special acknowledgement 21' which comprises a special acknowledgement code 21' like a faultlessly executed communication session. i.e., the special acknowledgement code 21' is converted into a normal acknowledgement code 21' or the special acknowledgement code 21' is evaluated like a normal acknowledgement code 21'. Thus, there is no immediate retransmission of the disturbed communication session $21^s$ in the same bus cycle $Δt_s$. On the contrary, the retransmission of the disturbed communication session $21^s$ is planned for the next bus cycle Δt.

Thus, there is no time offset in the transmission of the new value for the position of the valve 55 by the message 13 even in the bus cycle $Δt_s$ with the disturbed communication session $21^s$. The message 13 is still executed at time $t2_{n+1}$ as before.

The retransmission $21^w$ of the disturbed communication session $21^s$ is executed at time $t1_{n+1}^w$ in the bus cycle Δt following immediately. For such a retransmission $21^w$, a special communication section t30 is provided at the end of each bus cycle Δt. Planned communication sessions 13, 21 are executed at the beginning of each bus cycle Δt in a normal communication section t20.

Figure 6:
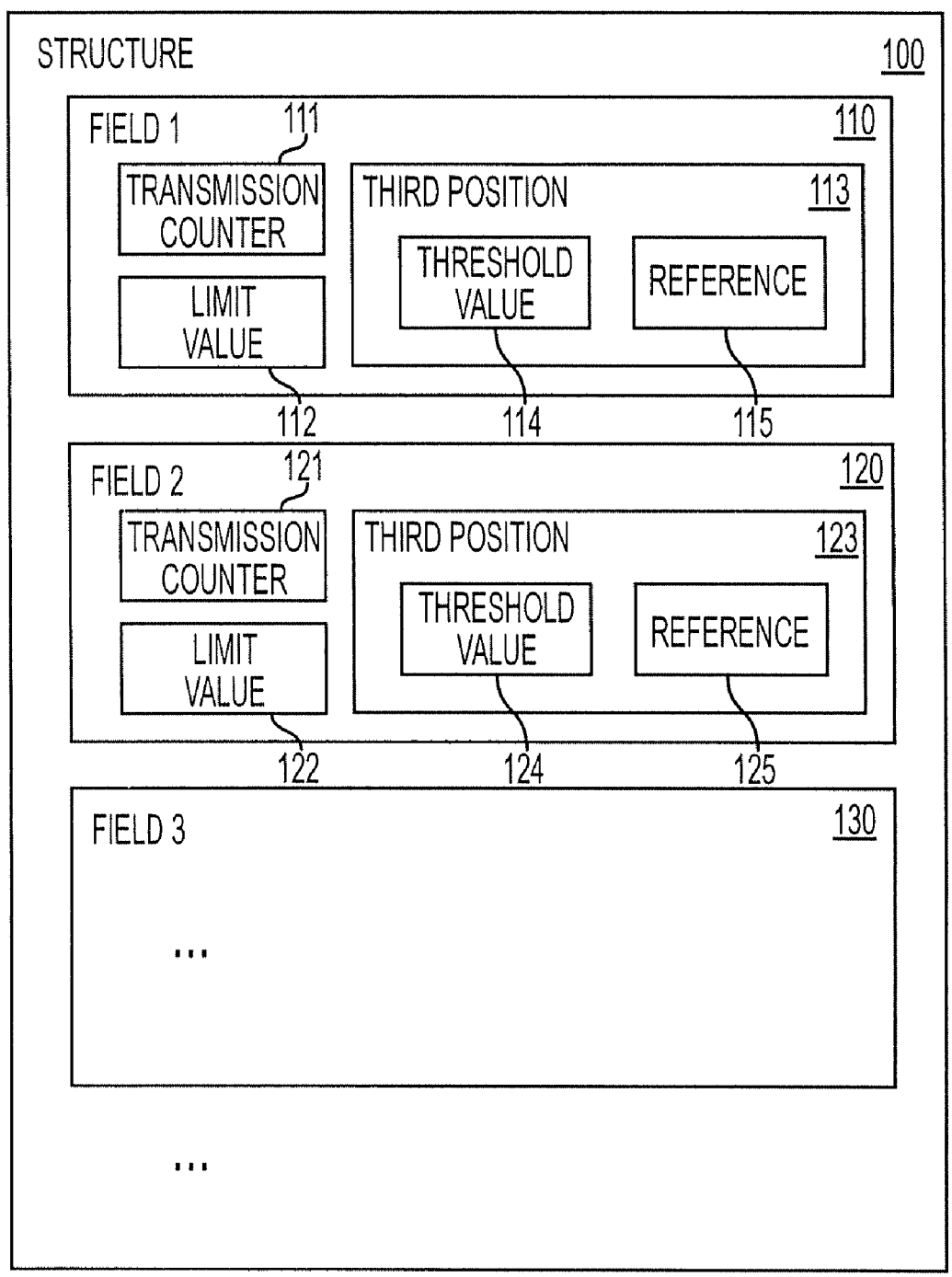
FIG. 6 shows a layout of a data structure.

The number of retransmissions $21^w$ of a disturbed communication session $21^s$ is counted in a retransmission counter 111 according to FIG. 6. If the retransmission counter 111 reaches a predetermined limit value 112, each retransmission $21^w$ of the disturbed communication session $21^s$ is acknowledged with a fault acknowledgement (not shown) which comprises a fault acknowledgement code, when the limit value 112 is reached. Thus, permanently disturbed communication sessions can be recognized as such and the communication station which can no longer be reached can be flagged as failed.

Dividing a bus cycle Δt into the normal communication section t20 and the special communication section t30 leads to a decoupling between messages 13, 21 of correspondingly planned communication sessions and message retransmissions $21^w$ due to disturbed communication sessions $21^s$. The message retransmission $21^w$ in bus cycle Δt—i.e. in the second bus cycle in FIG. 5—is decoupled from planned communication sessions (shown dashed) to be executed in the normal communication section t20.

Since the duration of the bus cycle Δt is predetermined and constant, either the duration of the normal communication section t20 or the duration of the special communication section t30 is also predetermined. If the duration of the normal communication section t20 is predetermined, the fixed bus cycle time Δt will produce the duration of the special communication section t30 and vice versa. The duration of the normal communication section t20 and special communication section t30 is dimensioned in such a manner that at least one message retransmission $21^w$ can take place during the special communication section t30.

FIG. 6 shows a structure 100 which is provided in the memory 5 (FIG. 2a, 2b) of a communication station 1, 2, 3. The structure 100 has a separate field 110, 120, 130 for each communication session—at least for each communication session in which the relevant communication station 1, 2, 3 is involved. In each field 110, 120, 130, the value of the retransmission counter 111, 121 is stored in a first position, the limit value 112, 122 is stored in a section position and the at least one threshold value 114, 124, together with a reference 115, 125 to the measure to be initiated when the threshold value 114, 124 is reached, is stored in a third position 113, 123.

The structure is used for compact storage of the essential data which are provided for executing the communication method. Storing a reference 115, 125 to the measure to be initiated when the threshold value 114, 124 is reached enables a program routine to be called up directly in which the measure is programmed.

The omission points " . . . " in the structure 100, on the one hand, and, on the other hand, in the field 130 indicate that the structure can comprise other fields 110, 120, 130, depending on the number of communication sessions, and that the field 130, like any other fields, basically has the same layout as the field 110, 120.

Figure 7:
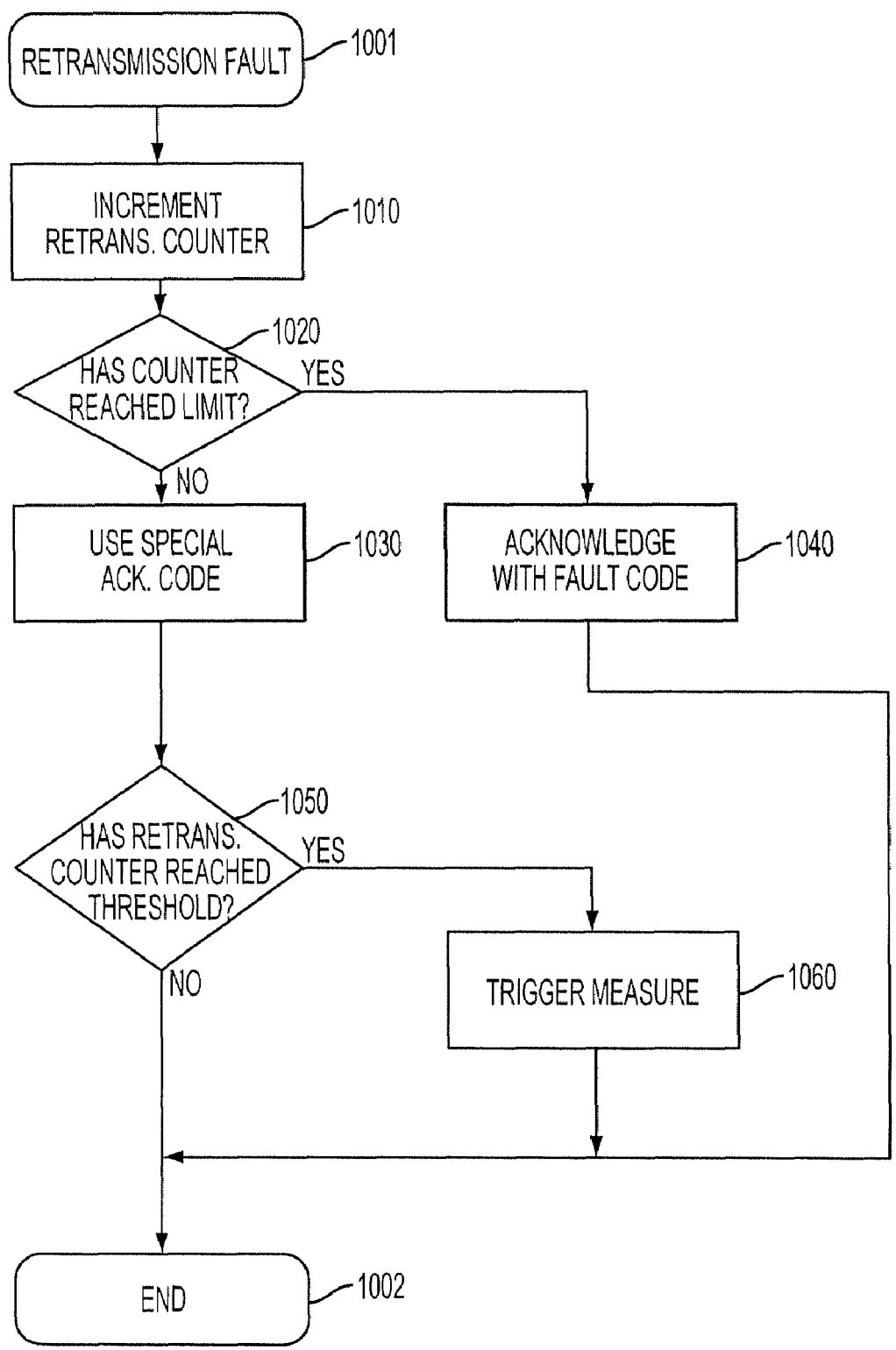
FIG. 7 shows a flowchart.

FIG. 7 shows in a flowchart an algorithm for essential aspects of the communication method, which begins in step 1001 if the retransmission $21^w$ of the disturbed communication session $21^s$ could not be executed faultlessly either. In step 1010, the retransmission counter 11, 121 (FIG. 6) is incremented with each retransmission $21^w$ of a disturbed communication session $21^s$ (FIG. 5).

In step 1020, a check is made whether the retransmission counter 11, 121 has reached the limit value 112, 122 (FIG. 6). If this is so, the system branches to step 1040 and the retransmission $21^w$ of the disturbed communication session is acknowledged with a fault acknowledgement code 21" (FIG. 4). After execution of step 1040, the algorithm is ended in step 1002. If it is found in step 1020 that the retransmission counter 11, 121 has not yet reached the limit value 112, 122, the algorithm is continued in step 1030.

In step 1030, the retransmission $21^w$ of the disturbed communication relation $21^s$ is acknowledged with the special acknowledgement code 21' (FIG. 5). The acknowledgement of the retransmission $21^w$ of the disturbed communication session $21^s$ with the special acknowledgement code 21' has the effect that a failed retransmission $21^w$ of the disturbed communication session $21^s$ is also treated like a faultlessly executed communication and a next retransmission $21^w$ is planned for a following bus cycle.

In step 1050, a check is made whether the retransmission counter 111, 121 has reached the threshold value 114, 124 (FIG. 6)—possibly one of a number of threshold values. If this is so, the system branches to step 1060 and a measure is triggered, the reference (address) of which is stored at position 115, 125 (FIG. 6). If, e.g., the limit value 112, 122 is set to the value "20", the threshold value 114, 124 can be set e.g. to value "10". I.e. after ten unsuccessful retransmissions $21^w$ of a disturbed communication session 215, the threshold value 114, 124 is reached and a corresponding measure 115, 125 can be initiated. This measure 115, 125 can include, e.g., outputting a warning message on a display device (not shown) in order to indicate the disturbed communication session $21^s$. The actual measure is implemented as program routine (subroutine).

As a reference 115, 125, its start address is stored at position 115, 125. When the threshold value is reached, the measure 115, 125 can be triggered directly on the basis of the stored reference 115, 125. After step 1060 has been executed, the algorithm is ended in step 1002. If it is found in step 1050 that the retransmission counter 111, 121 has not yet reached the threshold value 114, 124, the algorithm is ended immediately in step 1002.

The algorithm is started every time in step 1001 even if the retransmission $21^w$ of the disturbed communication session $21^s$ could not be executed faultlessly. If, in contrast, the first retransmission $21^w$ of the disturbed communication session $21^s$ has already been faultlessly executed, this is acknowledged with the normal acknowledgement code 21' analogously to step 1030. In this case, evaluation of the limit or threshold value 111, 121 and 114, 124 is not required.

Thus, a method for cyclic communication between communication stations 1, 2, 3, provided for controlling or monitoring a technical process 50, via a bus 4, is specified in which communication sessions 12, 13, 21, 31, which have been planned for the communication stations 1, 2, 3, are executed during in each case one bus cycle of predeterminable duration Δt. In the case of a disturbed communication session, its retransmission $21^w$ is planned for a subsequent bus cycle and the disturbed communication session is acknowledged with a special acknowledgement code.

The invention has been described in detail with particular reference to preferred embodiments thereof and examples, but it will be understood that variations and modifications can be effected within the spirit and scope of the invention.

The invention claimed is:

1. A method for cyclic communication via a bus, between communication stations provided for controlling a technical process, comprising:
   allotting repeated bus cycles to communication sessions such that during each bus cycle, each of the communication stations has a planned communication session, each of the bus cycles having a predetermined duration;
   in the case of a disturbed communication session, planning retransmission of the disturbed communication session for a bus cycle subsequent to the bus cycle in which the disturbance occurred; and
   acknowledging the disturbed communication session with a special acknowledgement code.

2. The method as claimed in claim 1, wherein for the bus cycle subsequent to the bus cycle in which the disturbance occurred;
   the communication sessions allotted to the bus cycle occur before retransmission of the disturbed communication session.

3. The method as claimed in claim 2, wherein retransmission of the disturbed communication session is planned for a bus cycle immediately subsequent to the bus cycle in which the disturbance occurred.

4. The method as claimed in claim 3, wherein
   successful communication sessions are acknowledged with normal acknowledgment codes, and
   the special acknowledgement code is produced in the same manner as the normal acknowledgement codes.

5. The method as claimed in claim 4, wherein the special acknowledgement code is converted into a normal acknowledgement code.

6. The method as claimed in claim 5, wherein
   if a first retransmission of the disturbed communication session is not successful, further retransmissions of the disturbed communication session are planned, and
   the number of retransmissions of the disturbed communication session is counted by a retransmission counter.

7. The method as claimed in claim 6, wherein
   the retransmission counter has a limit value, and
   after the limit value has been reached, a fault acknowledgment code is used to acknowledge any subsequent unsuccessful retransmissions of the disturbed communication session.

8. The method as claimed in claim 7, wherein the retransmission counter is read at least by the communication station involved in the disturbed communication session.

9. The method as claimed in claim 8, wherein
the retransmission counter has a threshold value which is below the limit value, and
when the number of unsuccessful retransmissions reaches the threshold value, the communication system undertakes alternate measures for the disturbed communication session.

10. The method as claimed in claim 9, wherein
a memory is provided in at least one of the communication stations,
the memory has first field to store a current value for the retransmission counter,
the memory has a second field to store the limit value, the threshold value, and information regarding the alternate measures.

11. The method as claimed in claim 1, wherein retransmission of the disturbed communication session is planned for a bus cycle immediately subsequent to the bus cycle in which the disturbance occurred.

12. The method as claimed in claim 1, wherein
successful communication sessions are acknowledged with normal acknowledgment codes, and
the special acknowledgement code is produced in the same manner as the normal acknowledgement codes.

13. The method as claimed in claim 1, wherein the special acknowledgement code is converted into a normal acknowledgement code.

14. The method as claimed in claim 1, wherein
if a first retransmission of the disturbed communication session is not successful, further retransmissions of the disturbed communication session are planned, and
the number of retransmissions of the disturbed communication session is counted by a retransmission counter.

15. The method as claimed in claim 14, wherein
the retransmission counter has a limit value, and
after the limit value has been reached, a fault acknowledgment code is used to acknowledge any subsequent unsuccessful retransmissions of the disturbed communication session.

16. The method as claimed in claim 15, wherein the limit value is set individually for each communication session.

17. The method as claimed in claim 15, wherein
the retransmission counter has a threshold value which is below the limit value,
when the number of unsuccessful retransmissions reaches the threshold value, the communication system undertakes alternate measures for the disturbed communication session,
a memory is provided in at least one of the communication stations,
the memory has first field to store a current value for the retransmission counter,
the memory has a second field to store the limit value, the threshold value, and information regarding the alternate measures.

18. The method as claimed in claim 14, wherein the retransmission counter is read at least by the communication station involved in the disturbed communication session.

19. The method as claimed in claim 14, wherein
the retransmission counter has a threshold value, and
when the number of unsuccessful retransmissions reaches the threshold value, the communication system undertakes alternate measures for the disturbed communication session.

20. The method as claimed in claim 1, wherein the special acknowledgement code avoids an immediate repeat of the disturbed communication session.

* * * * *